United States Patent [19]

Baker

[11] Patent Number: 4,543,887
[45] Date of Patent: Oct. 1, 1985

[54] CENTER BEAM RAILROAD FREIGHT CAR

[75] Inventor: William R. Baker, Northville, Mich.

[73] Assignee: Thrall Car Manufacturing Company, Chicago Heights, Ill.

[21] Appl. No.: 575,874

[22] Filed: Feb. 1, 1984

[51] Int. Cl.⁴ ............................................. B61D 17/00
[52] U.S. Cl. .................................. 105/355; 105/404; 105/416; 105/419
[58] Field of Search ............... 105/355, 411, 413, 414, 105/416, 418, 419, 420, 404, 409

[56] References Cited

U.S. PATENT DOCUMENTS

| 3,734,031 | 5/1973 | Wagner | 105/404 |
| 4,373,447 | 2/1983 | Pfister | 105/414 |

Primary Examiner—Craig R. Feinberg
Assistant Examiner—David A. Okonsky
Attorney, Agent, or Firm—Marshall, O'Toole, Gerstein, Murray & Bicknell

[57] ABSTRACT

A freight carrying railroad car comprising a body supported at each end by wheel-containing trucks; the body having a vertical center beam extending longitudinally the length of the car between bulkheads at each end of the car; the center beam comprising a center sill, a top sill parallel to and spaced above the center sill, and a plurality of vertical spaced apart columns rigidly connected at their lower ends to the center sill and at their upper ends to the top sill; and at each end of the car, a vertical plate extending from the center sill to the top sill, and from the bulkhead at that end inwardly along the center sill; the vertical plate being joined to the center sill, top sill, bulkhead and a plurality of said columns and having a width no more than about one-fifth of the distance between the bulkheads.

8 Claims, 6 Drawing Figures

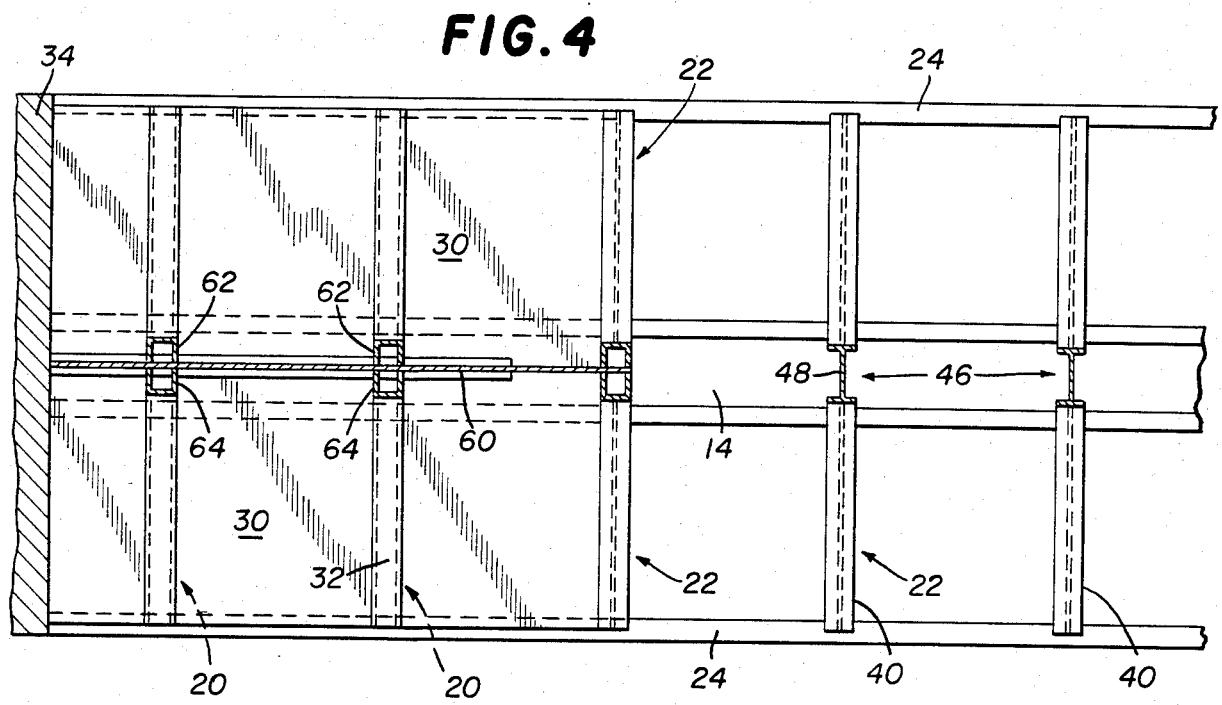
FIG. 4
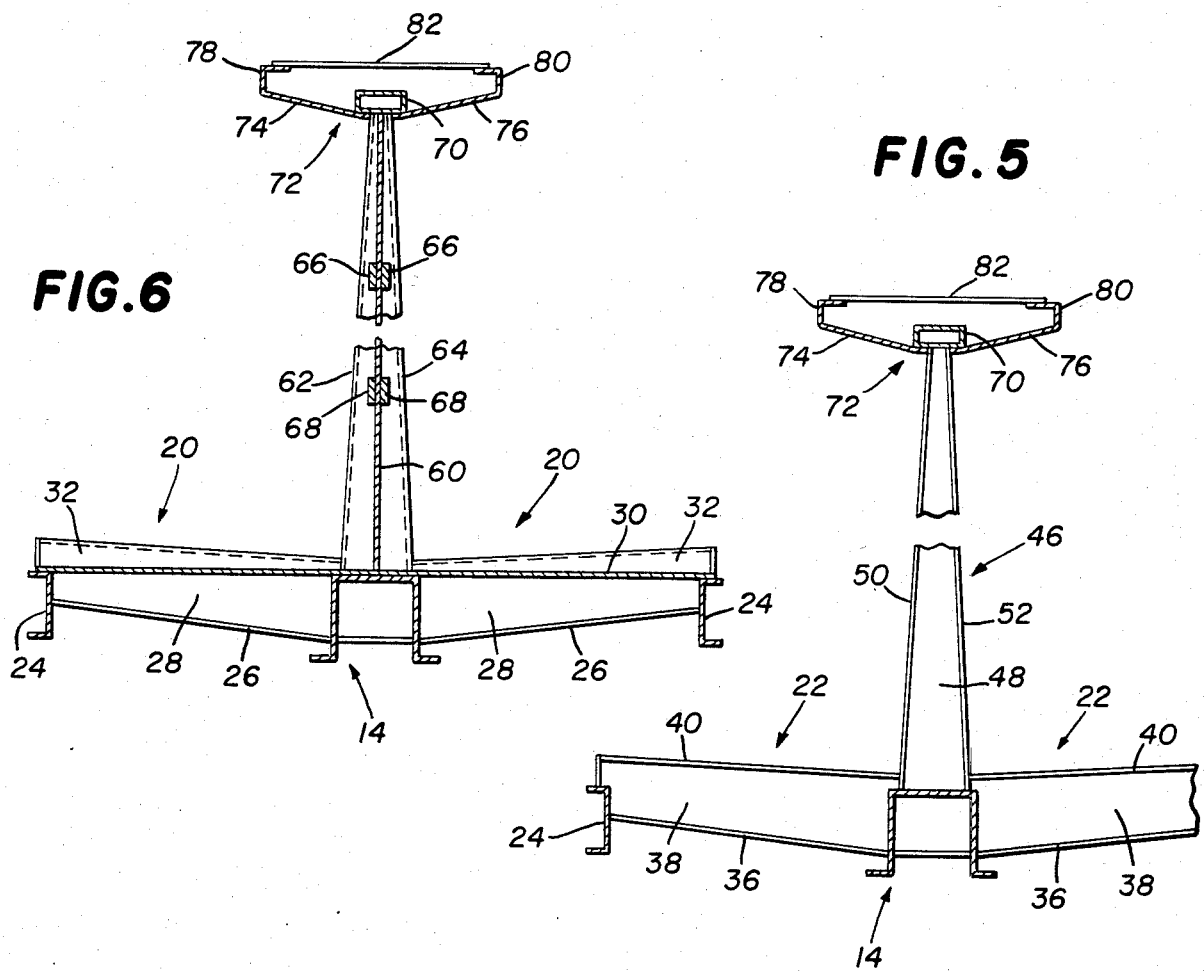
FIG. 6
FIG. 5

4,543,887

CENTER BEAM RAILROAD FREIGHT CAR

This invention relates to railroad cars. More particularly, this invention is concerned with an improved center beam railroad freight car having a reduced tare weight which does not sacrifice load carrying capacity.

BACKGROUND OF THE INVENTION

Center beam railroad freight cars have been in use hauling lumber, plywood and other sheet materials for about 20 years. This type of car is disclosed in Taylor U.S. Pat. No. 3,244,120. Wagner U.S. Pat. No. 3,734,031 discloses an improved center beam car.

Although center beam railroad cars built according to the Taylor patent and the Wagner patent, supra, are relatively lightweight and have been used commercially with great success, the high cost of fuel has made it essential that all car structures be further reduced in weight if at all possible. Because center beam cars were already considered to be lightweight, a further reduction in car weight without sacrificing load carrying capacity, car life or safety has presented a formidable problem. However, even though the problem has been very difficult, the need for a suitable solution has lead to my development of an improved center beam freight carrying railroad car having less weight per load carrying capacity than previous cars of this type.

SUMMARY OF THE INVENTION

According to the invention a freight carrying railroad car is provided comprising a body supported at each end by wheel-containing truck means; the body having a vertical center beam extending longitudinally the length of the car between bulkheads at each end of the car; the center beam comprising a center sill, a top sill parallel to and spaced above the center sill, and a plurality of vertical spaced apart columns rigidly connected at their lower ends to the center sill and at their upper ends to the top sill; and at each end of the car, a vertical plate extending from the center sill to the top sill, and from the bulkhead at that end inwardly along the center sill; the vertical plate being joined to the center sill, top sill, bulkhead and a plurality of said columns and having a width no more than about 20% and generally less than 10% of the distance between the bulkheads.

The railroad car desirably includes a pair of side sills and cross bearers extending from each side of the center sill to the adjacent side sill. Furthermore, many of the cross bearers advisably have a vertical web, a bottom lateral flange joined to the web and a top lateral flange joined to the web, with said top flange sloping inwardly from the side sill to the center sill.

The vertical plates extending from the center sill to the top sill will generally have vertical inner edges and the area between those edges is to be maintained open to keep the car lightweight. The area between the inner edges of the vertical plates at each end of the car can be free of bracing between any adjoining columns. Furthermore, the vertical plates desirably extend through the central portion of the columns to which they are joined.

The railroad car can include a shear plate at each end of the car extending between the side sills and adjacent bulkhead and be connected to the center sill. Also, a body bolster can be connected to the center sill and shear plate. The wheel-containing truck means can be a four wheel truck having a truck bolster operatively associated with the body bolster.

The shear plate is desirably supported in a horizontal position by the center sill and cross bearers beneath the shear plate, and the top of the shear plate has wedge shaped load supports lateral to and sloping downward towards the center sill.

While a prior art center beam car with side sills 63 feet long would weigh about 63,000 pounds, it is expected that a car according to the invention having side sills the same length will weigh about 58,000 pounds, for a weight reduction of 5,000 pounds.

A railroad car manufactured according to my invention can be made about 5,000 pounds lighter than a car of the same length now in commercial use. This reduction in weight permits increased load capacity as well as production of a car of greater length than was possible previously.

BRIEF DESCRIPTION OF THE DRAWINGS

FIG. 4 is an enlarged view of the left end of the car shown in FIG. 3;

FIG. 5 is a sectional view taken along the line 5—5 of FIG. 3; and

FIG. 6 is a sectional view taken along the line 6—6 of FIG. 3.

DETAILED DESCRIPTION OF THE DRAWINGS

To the extent it is reasonable and practical, the same numbers will be used to identify the same or similar elements or parts in the various views of the drawings.

Figure 1:
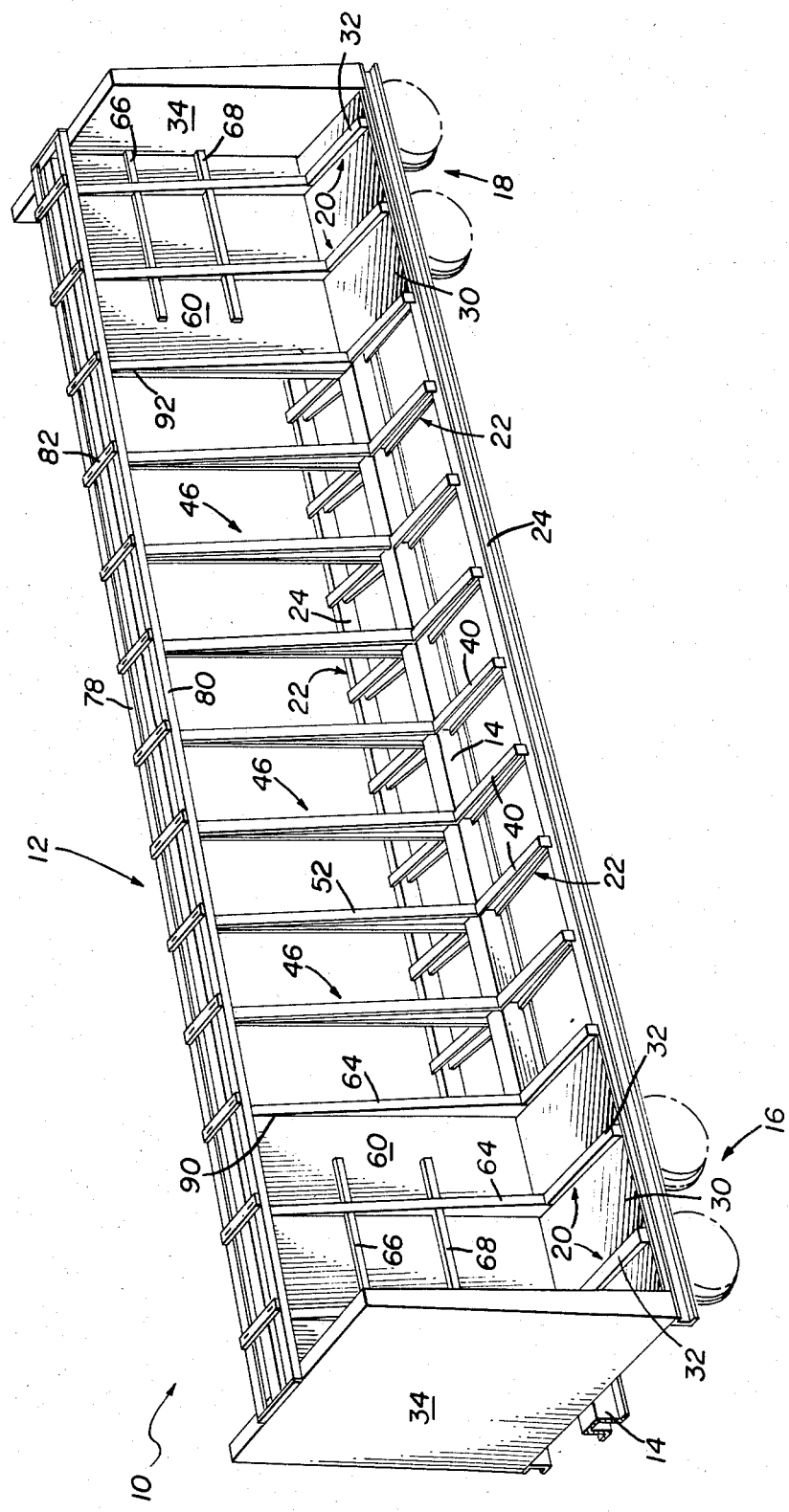
FIG. 1 is a perspective view of a lightweight center beam railroad freight car according to the invention.
Figure 2:
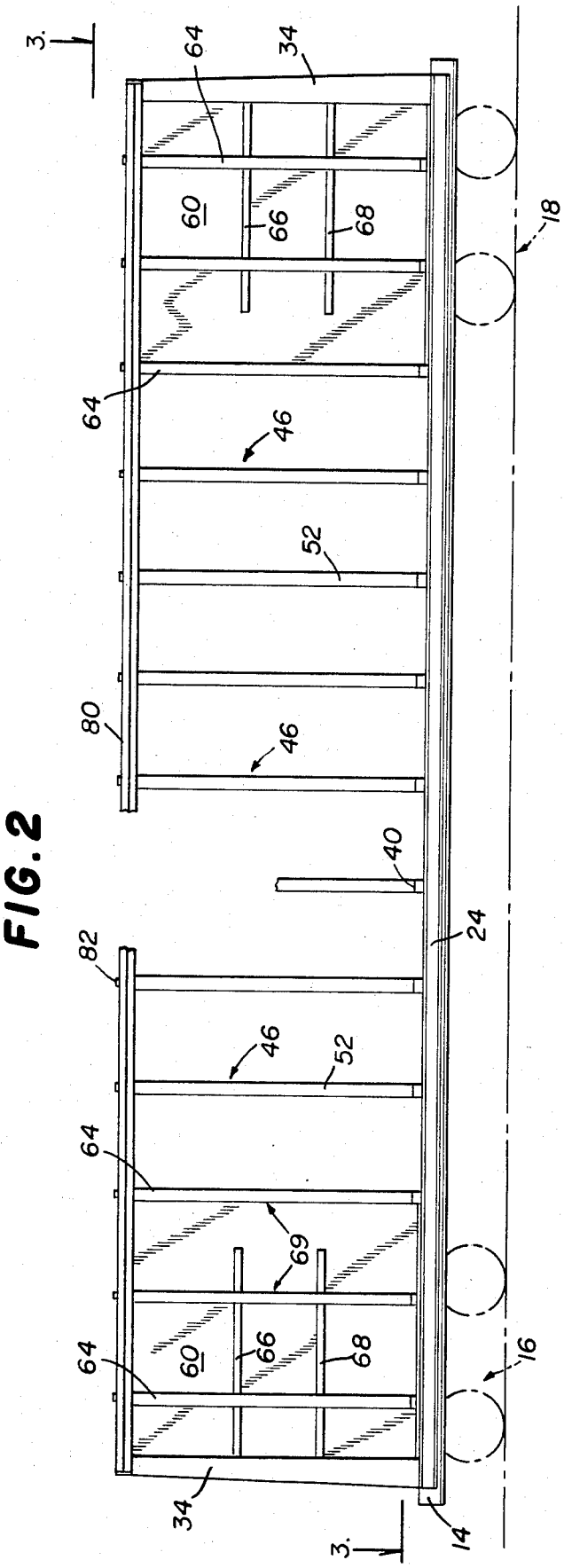
FIG. 2 is a side elevational view, partly broken away, of the center beam car shown in FIG. 1.
Figure 3:
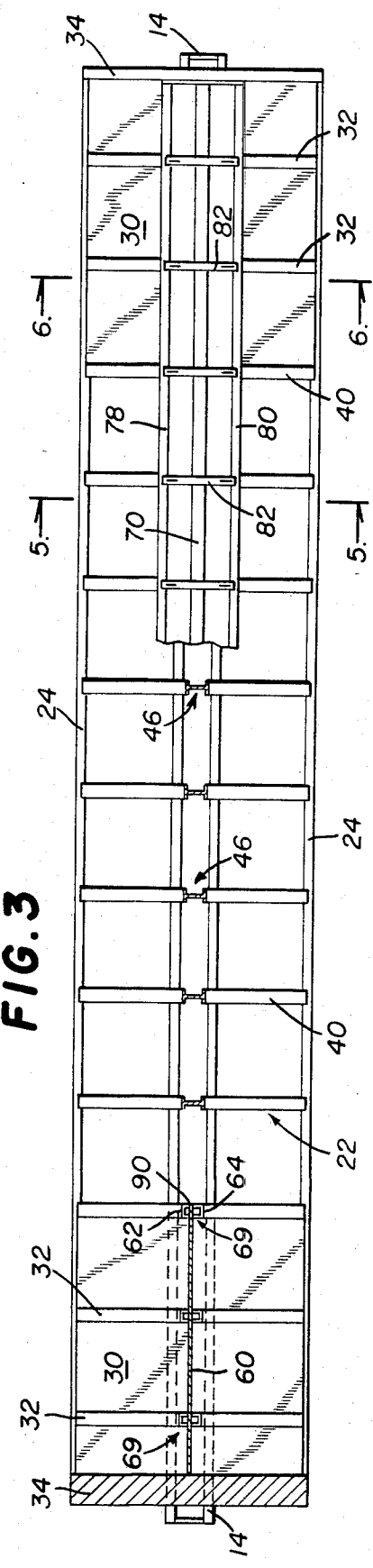
FIG. 3 is a sectional view taken along the line 3—3 of FIG. 2.

With reference to FIG. 1, the center beam railroad freight car 10 has a center beam 12 comprising a lightweight center sill 14 fabricated from two Z-shaped structural members, a top sill comprising rectangular tube 70 and chord 72, and columns 46 and 69. Body bolsters (not shown) are joined to the bottom opposite ends of the center sill and they in turn mate with truck bolsters in trucks 16 and 18 to support the car body.

Extending laterally from each side of center sill 14 are two different arrangements of cross bearers 20 and 22 (FIGS. 1, 5 and 6) joined at their ends to side sills 24. The cross bearers 20 are located at each end portion of the car above the trucks 16 and 18. Each cross bearer 20 has a sloped lower flange 26 and an upwardly projecting vertical web 28 (FIG. 6). A shear plate 30 rests on and is joined to the top of web 28. Shear plate 30, furthermore, rests on the top of center sill 14 and extends for the full width of the car to the two side sills 24. The purpose of the shear plate is to transfer some of the draft and buff loads from the center sill to the side sills and to reinforce the car in the vicinity of the body bolster.

Tapered sleeper members 32 are mounted on shear plate 30. Because of their inclined upper surface, sleeper members 32 tilt a load placed thereon towards center beam 12.

Each end of the railroad car has a bulkhead 34 between which center beam 12 extends longitudinally in vertical or upright position.

The cross bearers 22 have a sloped bottom flange 36, a vertical web 38 and a sloped top flange 40 which is in the same plane as the top of sleepers 32. Accordingly, a flat bottom load, such as pre-packed lumber, can rest inwardly tilted but in a straight line on the top of all such supporting surfaces. Although not shown in the drawings, it is within the scope of the invention to include a floor plate supported by the cross bearers 22 and sleepers 32 for the length of the car between the bulkheads.

Cross bearers 22 are readily fabricated and utilize a minimum of parts and bending. Since they require no tapered sleepers 32, they are easily installed and, in addition, provide excellent strength per weight.

Extending upwardly from center sill 14 in the central 60% to 80% or so of the car, where the cross bearers join the center sill, is a plurality of vertical columns 46 (FIGS. 1 and 5) which have a web 48 lateral to the center sill and two sloped flanges 50, 52 joined to the web edges. However, at the ends of the car and primarily above each shear plate 30, a vertical plate 60 extends upwardly for a distance equal to the height of columns 46 (FIGS. 1 and 6). Each plate 60 is joined to its adjacent bulkhead. On each side of plate 60, where the cross bearers join the center sill 14, it is reinforced by a pair of channel-shaped members 62 and 64 (FIGS. 1 and 6) identically shaped and placed opposite each other. Each pair of channel-shaped members 62, 64 form a column 69 which is divided by the vertical plate 60. The stem portions of channel-shaped members 62 and 64 are shorter at the top than at the bottom, giving the members a taper or slope which positions their outer surface in the same respective planes as flanges 50 and 52 of columns 46. As a result, the tops of the sleepers 32 and the tops 40 of cross bearers 22 intersect the columns 46 and channel-shaped members 62 and 64 at a right angle thus providing contact surfaces adapted to support goods packaged in generally rectangular shapes. The plates 60 are further reinforced against buckling by a pair of horizontal bars 66, 68 vertically spaced apart on each side of the plate.

It is an important feature of this invention that the space between adjacent columns 46 is left open. In other words, the plates 60 are of limited longitudinal length and do not extend the length of the car. The plates 60 generally extend longitudinally of the car only a very short distance beyond the end of the truck. The longitudinal distance between the vertical edges or ends 90, 92 (FIG. 1) of the two identical plates 60 will generally be from 60% to 80% of the distance between the bulkheads. This arrangement permits a very significant reduction in car weight.

Extending the full length of the car between and joined to the bulkheads is a rectangular tube 70 which is joined to the top of columns 46 and channel-shaped members 62 and 64. A wide chord member 72 is also mounted on the top of columns 46 and the columns formed by adjacent pairs of channel-shaped members 62 and 64. The wide chord member 72 (FIG. 5) is made of two separate plates 74 and 76 which extend between and are joined to the bulkheads 34. The inner longitudinal edges of plates 74 and 76 are joined, such as by welding, respectively to the bottom of tube 70. The plates 74 and 76 are each advisably tilted or sloped upwardly at a slight angle of about 10°. The outer ends of plates 74 and 76 are desirably bent upwardly to a vertical position and the edges then bent inwardly to a horizontal position as shown in FIG. 5 to thereby form an integral structural channel member 78, 80 on each plate. Lateral straps 82 are joined to the tops of the opposing channel members 78, 80 to stiffen the resulting wide chord 72.

The construction of bulkheads 34 is of conventional design and therefore is not described in further detail. The important thing is that the bulkheads be sufficiently strong to transfer forces to center beam 14 without yielding excessively. In addition, the ends of the center beam and its top structure are joined to the bulkhead by conventional means.

What is claimed is:

1. A freight carrying railroad car having a predetermined length comprising:
   a body supported at each end by wheel-containing truck means;
   the body having a vertical center beam extending longitudinally the length of the car between bulkheads at each end of the car;
   the center beam comprising a center sill, a top sill parallel to and spaced above the center sill, and a plurality of vertical spaced apart columns rigidly connected at their lower ends to the center sill and at their upper ends to the top sill; and
   at each end of the car, a vertical plate extending from the center sill to the top sill, and from the respective bulkhead at that end inwardly along the center sill;
   each vertical plate being joined to the center sill, top sill, bulkhead and a plurality of said columns such that opposed facing ends of said vertical plates are spaced from each other a distance of at least 60% of the length of said car between the bulkheads.

2. A freight carrying railroad car according to claim 1 in which the vertical plates extend through the central portion of the columns to which they are joined.

3. A freight carrying railroad car according to claim 1 in which the vertical plates have inner edges and the area between adjoining columns is open between the vertical plates at each end of the car.

4. A freight carrying railroad car according to claim 3 in which the area between the inner edges of the vertical plates at each end of the car contains no ancillary bracing between any adjoining columns.

5. A freight carrying railroad car according to claim 1 having a pair of side sills and cross bearers extending from each side of the center sill to the adjacent side sill.

6. A freight carrying railroad car according to claim 5 in which many of the cross bearers have a vertical web, a bottom lateral flange joined to the web and a top lateral flange joined to the web, with said top flange sloping inwardly from the side sill to the center sill.

7. A freight carrying railroad car according to claim 5 including a shear plate at each end of the car extending between the side sills and adjacent bulkhead and connected to the center sill.

8. A freight carrying railroad car according to claim 7 in which the shear plate is supported in a horizontal position by the center sill and cross bearers beneath the shear plate, and the top of the shear plate has wedge shaped load supports lateral to and sloping downward towards the center sill.

* * * * *